March 6, 1956 H. E. KIMES 2,736,953
INSERT MOUNTING TOOL
Filed July 7, 1952

Inventor:
Harold E. Kimes
By Gary, Desmond & Parker
Attys.

United States Patent Office 2,736,953
Patented Mar. 6, 1956

2,736,953
INSERT MOUNTING TOOL

Harold E. Kimes, Freeport, Ill., assignor to Harold E. Kimes Corporation, Freeport, Ill., a corporation of Illinois Application July 7, 1952, Serial No. 297,523

1 Claim. (Cl. 29—225)

This invention relates to molding anti-skid treads on tire casings, and more particularly to mounting a chain of U-shape wire inserts in fixed position on an annular guide rib of a tire mold of the type disclosed in my co-pending application Serial No. 171,813, filed July 3, 1950.

In forming an anti-skid tread on a tire casing by use of the mold disclosed in said pending application, a chain of wire inserts is first mounted in fixed position upon an annular guide rib provided on the inner face of a mold matrix in order that the metal inserts may be properly located in the tire tread during the subsequent molding operation. The inserts are generally U-shape with the ends of their legs connected to adjacent inserts to form a chain of inserts adapted to be molded as a unit within a tire tread. The chain of inserts is adapted to be manually pressed into engagement upon the guide rib to cause the resilient legs of the inserts to straddle and clamp the rib therebetween, the chain of inserts extending throughout the circumference of the rib with its opposite ends adjacent each other.

To facilitate mounting of the chain of inserts upon an annular guide rib extending around the inner face of a mold matrix, the present invention contemplates the provision of a tool adapted to engage a chain of inserts and to be manually operated to successively roll the insert in the chain into fixed position upon the guide rib. Prior to the invention and use of this tool, the hands and arms of operators were often burned due to accidental contact with a heated mold during mounting of the chain of inserts therein.

This invention further contemplates the provision of an insert mounting tool embodying a roller journaled on a handle to roll the chain of inserts onto the annular guide rib of a tire mold matrix.

This invention further contemplates the provision of an insert mounting tool embodying means for detachably securing a chain of inserts in engagement with the roller for insertion of the inserts into the mold.

This invention embodies other novel features, details of construction and arrangement of parts which are hereinafter set forth in the specification and claim and illustrated in the accompanying drawing, wherein:

Figure 1:
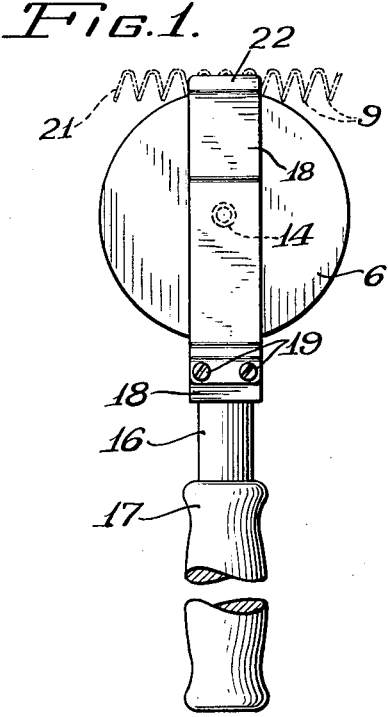
Fig. 1 is a side elevational view illustrating an insert mounting tool embodying features of the present invention.

Referring now to the drawing for a better understanding of this invention, the insert mounting tool is shown as comprising a wheel 6 formed with an annular groove 7 substantially conforming, in cross section, to the contour of the base portion 8 of a generally U-shape resilient metal insert 9, the wheel having spaced side flanges 11—11 engaging adjacent legs 12—12 of the insert. The wheel 6 is preferably formed of metal and journaled between spaced arms 13—13 on a pin 14 having its ends mounted in aligned apertures formed in the arms, the ends of the pin being peened or flattened to secure the wheel, pin and arms in assembled relation.

Figure 2:
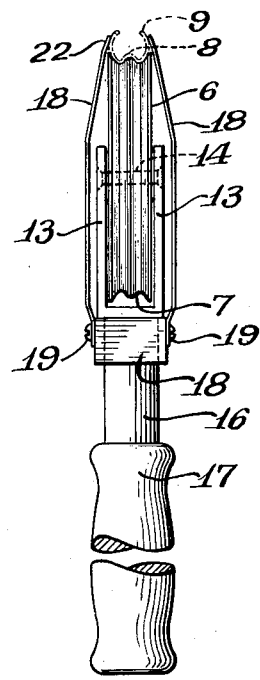
Fig. 2 is a front elevational view of same.
Figure 3:
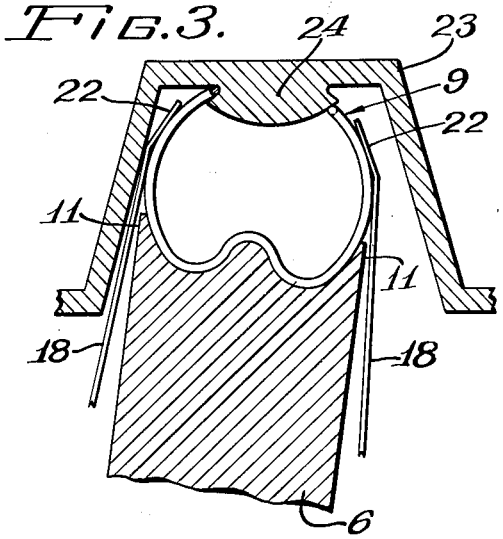
Fig. 3 is a detail sectional view illustrating the manner in which a chain of inserts are engaged by the mounting tool with several adjacent inserts positioned against a matrix guide rib prior to forcing same into seated position straddling the rib.
Figure 5:
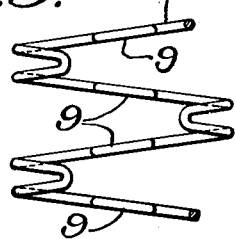
Fig. 5 is a top plan view illustrating a chain of U-shape inserts of the type adapted to be engaged by the tool and seated in position straddling the matrix guide rib.

The arms 13—13 are formed on or secured to one end of a guide 16 which is engaged at its other end to a handle 17 of suitable size and shape to be grasped by the hand of the operator. A carriage 18 is slidably mounted on the guide 16 for reciprocative movement between the arms 13—13 and the handle 17 and carries a pair of resilient fingers 18—18 secured thereto by screws 19. The fingers 18—18 are formed from lengths of flat spring metal and extend along opposite sides of the wheel to engage between their free ends opposite sides of a chain of inserts 21 and to hold same positioned in the annular groove 7, as illustrated in Figs. 1 to 3 in the drawing. It will be noted that the free ends of the resilient fingers 18—18 are bowed toward each other at 22—22 to yieldably engage inserts against displacement outwardly from the wheel groove 7.

To imbed a chain of inserts 21 within a tread of a tire casing, it is desirable to first secure the chain of inserts in fixed position within a mold matrix 23. As set forth in my pending patent application heretofore mentioned, the matrix is provided with an annular guide rib 24 of dovetail cross-section to be straddled and clamped between the legs 12—12 of the chain of inserts.

Figure 4:
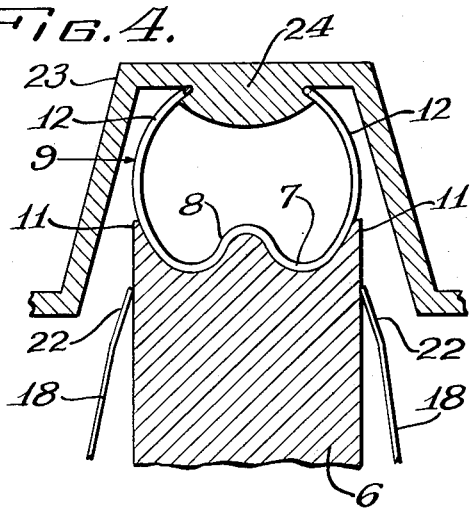
Fig. 4 is a detail sectional view, corresponding to Fig. 3, illustrating the manner in which the tool moves an insert into seated position straddling the guide rib.

To mount the chain of inserts in fixed position upon the guide rib 24 without burning the hands and arms of the operator, several adjacent inserts 9 are engaged against the wheel 6 by the resilient fingers 18—18, in the manner illustrated in Figs. 1 and 2, and then pressed into fixed position straddling the guide rib, as illustrated in Figs. 3 and 4; after which the carriage 18 is moved toward the handle 17 to retract the resilient fingers 18—18. After several adjacent inserts 9 have been seated on the guide rib 24 and the fingers 18—18 retracted, the tool is moved along the inside of the matrix to cause the wheel 6 to successively roll the other connected inserts into seated position on the guide rib until the entire chain of inserts is secured in fixed position within the matrix.

While this invention has been shown in but one form, it is obvious to those skilled in the art that it is not so limited but is susceptible of various changes and modifications without departing from the spirit and scope of the claimed invention.

I claim as my invention:

In a tool for mounting a chain of connected generally U-shape resilient wire inserts upon an annular guide rib of dovetail cross-section provided on the inner side of a tire mold matrix, a handle, a grooved wheel supported for rotational movement on said handle, a pair of resilient fingers formed of thin strip metal arranged on opposite sides of said wheel normally yieldably resisting displacement of inserts from the grooved wheel, said fingers having sufficient width to engage at least two inserts therebetween, and carriage means slidable on said handle to support said fingers for movement out of engagement with inserts disposed on said grooved wheel, said grooved wheel having spaced annular flanges to engage opposite sides of inserts disposed on the wheel.

References Cited in the file of this patent

UNITED STATES PATENTS

| | | |
|---|---|---|
| 324,121 | Kolb | Aug. 11, 1885 |
| 1,110,690 | Hurt | Sept. 15, 1914 |
| 1,990,763 | Walper | Feb. 12, 1935 |
| 2,007,067 | Yarger | July 2, 1935 |
| 2,055,440 | Johns | Sept. 22, 1936 |
| 2,206,364 | Petre | July 2, 1940 |
| 2,486,666 | Maudlin | Nov. 1, 1949 |